United States Patent
Brown et al.

(10) Patent No.: US 10,389,747 B2
(45) Date of Patent: Aug. 20, 2019

(54) FACILITATING SCANNING OF PROTECTED RESOURCES

(71) Applicant: HEWLETT-PACKARD DEVELOPMENT COMPANY, L.P., Houston, TX (US)

(72) Inventors: Richard Brown, Bristol (GB); Jonathan Griffin, Bristol (GB); Andy Norman, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 33 days.

(21) Appl. No.: 15/535,826

(22) PCT Filed: Feb. 27, 2015

(86) PCT No.: PCT/US2015/018073
§ 371 (c)(1),
(2) Date: Jun. 14, 2017

(87) PCT Pub. No.: WO2016/137505
PCT Pub. Date: Sep. 1, 2016

(65) Prior Publication Data
US 2017/0353485 A1    Dec. 7, 2017

(51) Int. Cl.
*H04L 29/06* (2006.01)
*G06F 9/455* (2018.01)
(Continued)

(52) U.S. Cl.
CPC ...... *H04L 63/1433* (2013.01); *G06F 9/45558* (2013.01); *G06F 21/554* (2013.01);
(Continued)

(58) Field of Classification Search
CPC .... G06F 9/45587; G06F 21/56; G06F 21/567; G06F 3/0664; G06F 21/55; G06F 21/564; G06F 2221/2115; H04L 63/1433
See application file for complete search history.

(56) References Cited

U.S. PATENT DOCUMENTS 6,502,135 B1    12/2002    Munger et al.
8,539,582 B1    9/2013    Aziz et al.
(Continued)

FOREIGN PATENT DOCUMENTS

TW    201209631    3/2012
TW    I412950    10/2013
(Continued)

OTHER PUBLICATIONS

Bahram, S. et al., DKSM: Subverting Virtual Machine Introspection for Fun and Profit (Research Paper), Aug. 12, 2010, 10 pages.
(Continued)

*Primary Examiner* — Ali S Abyaneh
*Assistant Examiner* — Paul E Callahan
(74) *Attorney, Agent, or Firm* — HPI Patent Department

(57) ABSTRACT

Example implementations relate to facilitating scanning of protecting computing resources. In example implementations, a computing device receives a scan indicator that indicates an external agent is prepared to scan a protected resource of the computing device; identifies a protected action that may be performed by the data processor, the protected action facilitating scanning the protected resource of the computing device by the external agent, the protected action comprising a change in a state of the protected resource; performs the protected action; and provides the external agent with data indicating a current state of the protected resource.

19 Claims, 4 Drawing Sheets

(51) Int. Cl.
*G06F 21/56* (2013.01)
*G06F 21/55* (2013.01)

(52) U.S. Cl.
CPC ............ *G06F 21/56* (2013.01); *G06F 21/564* (2013.01); *G06F 2009/45587* (2013.01); *G06F 2221/2115* (2013.01)

(56) References Cited

U.S. PATENT DOCUMENTS

| | | |
|---|---|---|
| 2004/0068662 A1 | 4/2004 | Ho et al. |
| 2008/0016339 A1 | 1/2008 | Shukla |
| 2008/0320594 A1 | 12/2008 | Jiang |
| 2009/0158432 A1 | 6/2009 | Zheng et al. |
| 2011/0047618 A1 | 2/2011 | Evans et al. |
| 2012/0144489 A1* | 6/2012 | Jarrett .................. G06F 21/566 726/24 |
| 2012/0311708 A1 | 12/2012 | Agarwal et al. |
| 2013/0347052 A1 | 12/2013 | Choudrie |
| 2014/0053272 A1 | 2/2014 | Lukacs et al. |
| 2014/0090059 A1 | 3/2014 | Wang et al. |
| 2015/0058619 A1* | 2/2015 | Sweet ..................... G06F 21/55 713/155 |

FOREIGN PATENT DOCUMENTS

| | | |
|---|---|---|
| WO | WO-201207869 A1 | 6/2012 |
| WO | WO-2013134206 A1 | 9/2013 |

OTHER PUBLICATIONS

Jiang, X. et al., "Stealthy Malware Detection through VMM-Base "Out-of-the-Box" Semantic View Reconstruction," (Research Paper), Oct. 29-Nov. 2, 2007, 11 pages.

\* cited by examiner

FACILITATING SCANNING OF PROTECTED RESOURCES

BACKGROUND

Computing devices, such as personal computers, server computers, smart phones, and tablet computers, are often subject to problems, which may stem from faulty hardware and/or software. Problems with computing devices may be difficult to detect and diagnose. Malicious software ("malware"), for example, may be designed to hide itself on an infected system, making it difficult to detect by traditional means.

BRIEF DESCRIPTION OF THE DRAWINGS

The following detailed description references the drawings, wherein.

DETAILED DESCRIPTION

Figure 1:
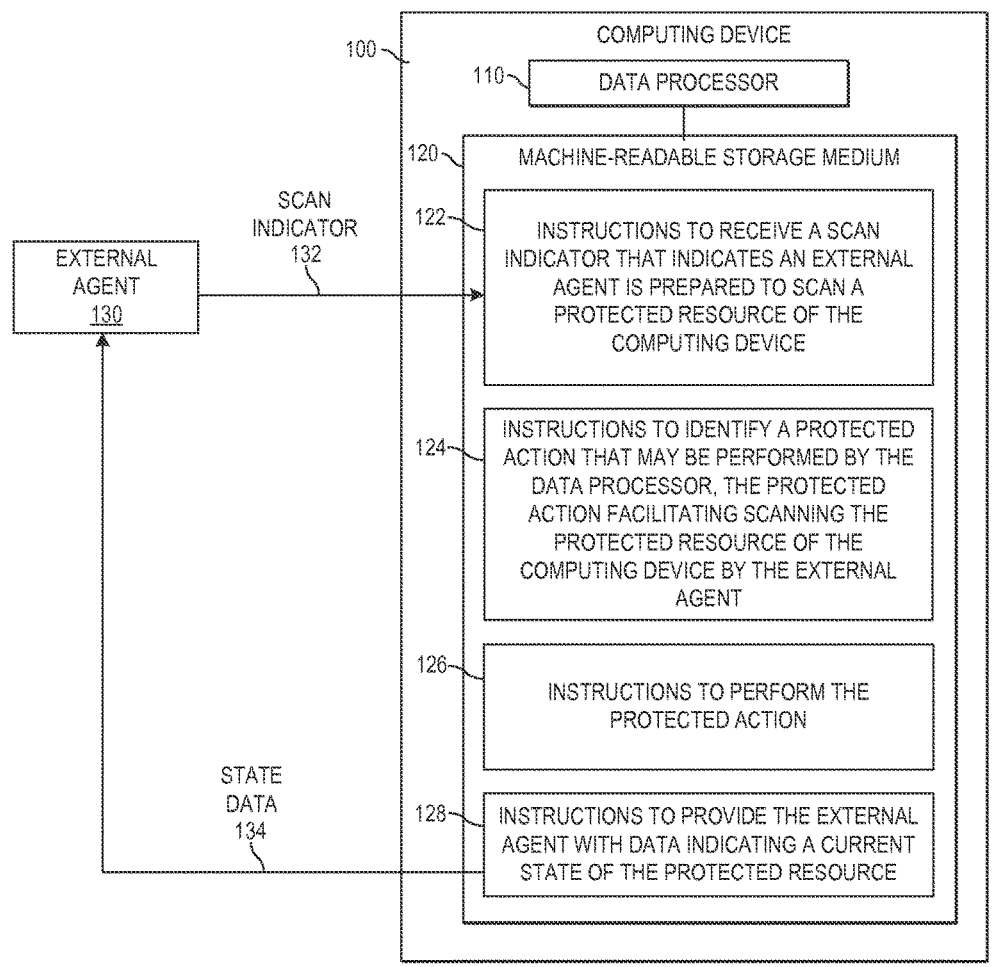
FIG. 1 is a block diagram of an example computing device for facilitating scanning of protected resources.

An internal agent included in a computing device is designed to facilitate the scanning of that computing device by an external agent, enabling the discovery of potential problems in the computing device. Some computing device problems, such as malicious software, may be difficult to detect internally. For example, malware may be designed to hide itself from various antivirus software scans, e.g., inspection by the computing device on which the malware is installed and/or running. In some situations, an external agent, e.g., one running on a separate computing device, may be able to detect problems that an internal agent cannot. However, malware may also be designed to hide itself from external inspection, e.g., by hiding in areas not traditionally accessible to an external agent, or by attempting to alter the state of the computing device so as to confuse or hide itself from a scan by an external agent. As discussed in further detail below, an internal agent may facilitate scanning of computing device by taking certain actions, such as making certain protected resources available for scanning and/or placing the computing device in a particular state, to name a few.

As used herein, a "protected resource" generally refers to a computing device resource, the safety and/or stability of which is not generally guaranteed when subject to being scanned and/or manipulated by an entity external to the computing device, and/or a computing device resource that is internally obscured and/or not generally accessible to an entity external to the computing device. In addition, a protected resource may not have the most up-to-date values/ data when examined, e.g., an external scan of a file on a permanent storage disk may not reflect the most recent writes to the file unless the disk cache is flushed; and the internal value of an IP address corresponding to a domain name might be out of date unless the DNS cache has been recently flushed, forcing a fresh DNS request to the network when the device next tries to resolve the domain name.

The ability to scan protected resources may help identify systems threatened by various software and/or hardware issues. A computing device may, for example, be infected with malware that manipulates internal scans of the computing device's registry in a manner that makes it appear as though the malware isn't there, e.g., by hooking into APIs of the computing device that are used to examine the registry data. In some situations, a scan of the registry performed by an external agent may also fail to discover the registry data, e.g., if the registry data inserted by the malware is not currently loaded on the random access memory (RAM) of the computing device. However, when using an internal agent to facilitate scanning the registry data, the internal agent may load one or more registry hives into the RAM of the computing device prior to the external scan, enabling an external agent to scan portions of the registry that may have not been otherwise accessible and allowing discovery of a potential problem in the scanned computing device's registry.

Referring now to the drawings, FIG. 1 is a block diagram of an example computing device 100 for facilitating scanning of protected resources. Computing device 100 may be, for example, a server computer, a notebook computer, a desktop computer, an all-in-one system, a workstation, a tablet computing device, or any other computing device suitable for execution of the functionality described below, including peripheral devices, such as printers or network switches that include a data processor. In the example of FIG. 1, the computing device 100 includes data processor 110 and machine-readable storage medium 120.

Data processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to implement the procedure for facilitating scanning of protected resources, as described below. As an alternative or in addition to retrieving and executing instructions, data processor 110 may include one or more electronic circuits that include a number of electronic components for performing the functionality of one or more of instructions 122, 124, 126, 128.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for facilitating scanning of protected resources.

As shown in FIG. 1, the computing device 100 receives a scan indicator 132 that indicates an external agent 130 is prepared to scan a protected resource of the computing device 100 (122). The external agent 130 may be hardware, software, or a combination thereof, which is implemented in a computing device that is separate from the example computing device 100. The scan indicator 132 may be provided by the external agent 130, as in the example of FIG. 1, or may be provided by a third party, or preconfigured internally, e.g., in situations where a regularly scheduled scan of the computing device is to take place, the external agent 130 need not provide the computing device with a scan indicator 130.

In some implementations, the protected resource(s) to be scanned by the external agent 130 is/are specified by the external agent 130, e.g., in the scan indicator 132. For example, the external agent 130 may provide the computing device 100 with data indicating that the external agent is prepared to scan the registry data, RAM data, process data, network data, and/or permanent storage data. In some implementations, the scan indicator 132 does not indicate which protected resource(s) the external agent 130 is prepared to scan. In this situation, the computing device 100 may determine which protected resource(s), if any, to make available for inspection/scanning by the external agent 130.

The computing device 100 identifies a protected action that may be performed by the data processor 110, the protected action facilitating scanning the protected resource of the computing device 100 by the external agent 130 (124). The protected action(s) performable by the data processor 110 may vary, and may depend upon the protected resource(s) to be made available for scanning. Some examples of protected actions that may correspond to various protected resources are provided below.

In situations where the protected resource is registry data, the protected action may include loading registry data into RAM. In situations where the protected resource is RAM data, the protected action may include loading swapped out memory pages into RAM. In situations where the protected resource is process data, the protected action may include loading one or more swapped out processes into RAM. In situations where the protected resource is network data, such as the ARP (Address Resolution Protocol) and/or DNS (Domain Name Service) caches, the protected action may include clearing a network cache, such as the ARP and/or DNS caches, of the computing device. In situations where the protected resource is permanent storage data, such as hard drive data, the protected action may include flushing a cache for the permanent storage data.

The computing device 100 performs the protected action (126). For example, in situations where the external agent 130 is preparing to scan local permanent storage, e.g., a hard drive, of the computing device 100, the computing device 100 may flush the permanent storage cache. In this example, flushing the permanent storage cache is designed to push any changes, e.g., write operations, that have not yet been performed. By ensuring that the permanent storage cache is flushed, the external agent 130 may have reasonable assurance that it is inspecting the most up to date state of permanent storage, e.g., without any operations waiting in the cache to be written. Other protected actions, and/or actions unrelated to protected resources, may also be performed by the computing device 100.

The computing device 100 provides the external agent 130 with data 134 indicating a current state of the protected resource (128). In the permanent storage cache flushing example, the computing device 100 may notify the external agent 130 that the permanent storage device has been flushed, e.g., indicating that the hard drive cache is empty and that all changes previously in the cache were written to the hard drive. In some implementations, the computing device 100 may perform its own internal scan, e.g., of the hard drive, and provide the results of the internal scan to indicate the state of the protected resource.

Upon receipt of the data indicating the state of the protected resource, the external agent 130 may proceed with scanning the protected resource and/or any other resource of the computing device 100. As discussed above, the scans of protected resources may enable the external agent 130 to determine whether the computing device may be compromised, e.g., by malware, corrupted data, and/or software bugs.

While described in FIG. 1 as being implemented in two physically separate and distinct computing devices, in some implementations, the separation of the external agent 130 from the computing device 100 may be logical. For example, in some situations, the computing device may be a virtual machine and the external agent 130 may be software running on a host machine that hosts the virtual machine. Facilitating scanning of protected resources in the context of virtual machines is discussed in further detail below, with reference to FIGS. 2 and 3.

Figure 2:
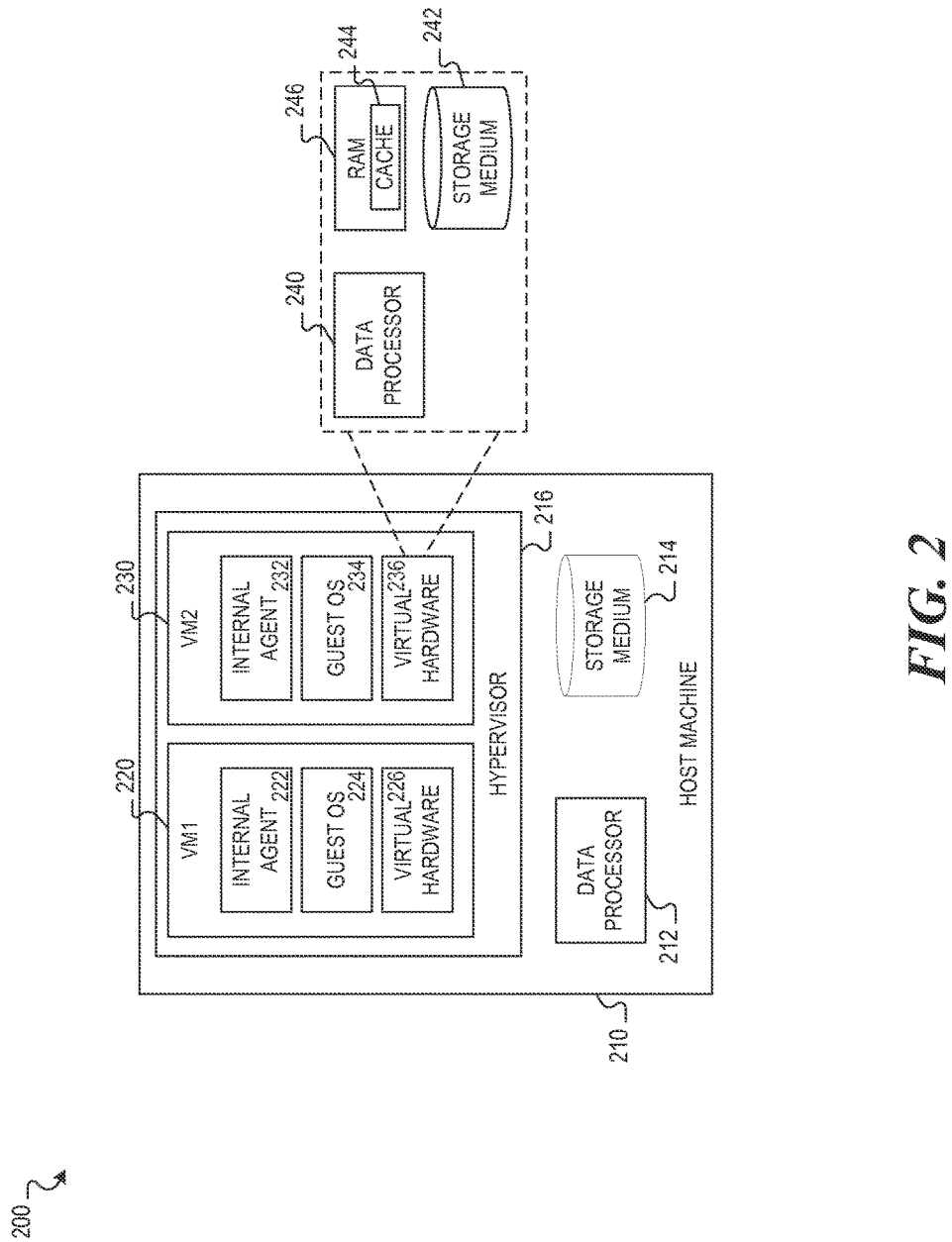
FIG. 2 is a block diagram of an example virtual machine environment in which an internal agent facilitates the scanning of protected resources.

FIG. 2 is a block diagram of an example virtual machine environment 200 in which an internal agent, e.g., 222 and/or 232, facilitates the scanning of protected resources. Host machine 210 includes a computing device, such as a computing device described above with reference to FIG. 1. As with the example computing device of FIG. 1, the example host machine 210 includes a data processor 212 and machine-readable storage medium 214. Other components, while not depicted in the example environment 200, may also be included in the host machine, such as RAM, removable storage devices, communications ports, etc.

A hypervisor 216, also known as a virtual machine monitor, runs on the host machine and provides an environment that permits one or more guest operating systems (OSs) to execute on the host machine 210. For example, the hypervisor may provide an operating platform that permits each guest OS to request virtual hardware resources that are virtualized by the hypervisor. The hypervisor may then allocate hardware resources of the host machine to each requesting guest OS. Each guest OS is implemented in its own virtual machine, with its own virtual hardware that is logically distinct from the virtual hardware of other virtual machines of the host machine.

Accordingly, each virtual machine emulates a separate computing device, the configurations of which may vary, including variations of processor architecture, number of processors, amount of storage space, amount of memory, boot properties, etc. In some implementations, additional attributes may be specified in a set of one or more configuration files, e.g., stored in the storage medium 214 of the host machine 210. The guest OS included in the virtual machine may be any operating system that can be installed in a virtual machine and executed by a computing device. For example, in some implementations, the guest OS may include a preconfigured operating system with a number of applications that are capable of being executed within the OS.

As depicted in the example environment 200, the example host machine 210 hosts two virtual machines, VM1 220 and VM2 230, each with their own guest OS, 224 and 234, and virtual resources, 226 and 236. Each virtual machine may also run one or more applications, such as an internal agent, 222 and 232. The example environment 200 also depicts example virtual hardware 236, which includes a virtual data processor 240, storage medium 242, storage medium cache 244, and RAM 246. The virtual hardware 236 is treated by the guest OS 234 as though it were traditional hardware of a traditional computing device, though it uses a portion of the host machine hardware resources allocated to it by the hypervisor 216.

In this environment 200, the internal agents, 222 and 232, facilitate scanning of protected resources of their respective virtual machines. For example, internal agent 222 facilitates the scanning of protected resources of the guest OS 224 and virtual hardware 226 of VM1 220, while internal agent 232 facilitates the scanning of protected resources of the guest OS 234 and virtual hardware 236 of VM2 230. In this context, the external agent may be, for example, an application running on the host machine 210, a third party machine, or a separate virtual machine also hosted by the host machine 210.

The example virtual machine environment 200 is one example of a virtual machine implementation that may benefit from using an internal agent to facilitate scanning of protected resources. Other types of environments, both virtual machine and traditional, may also take advantage of an internal agent to facilitate scanning of protected resources.

Figure 3:
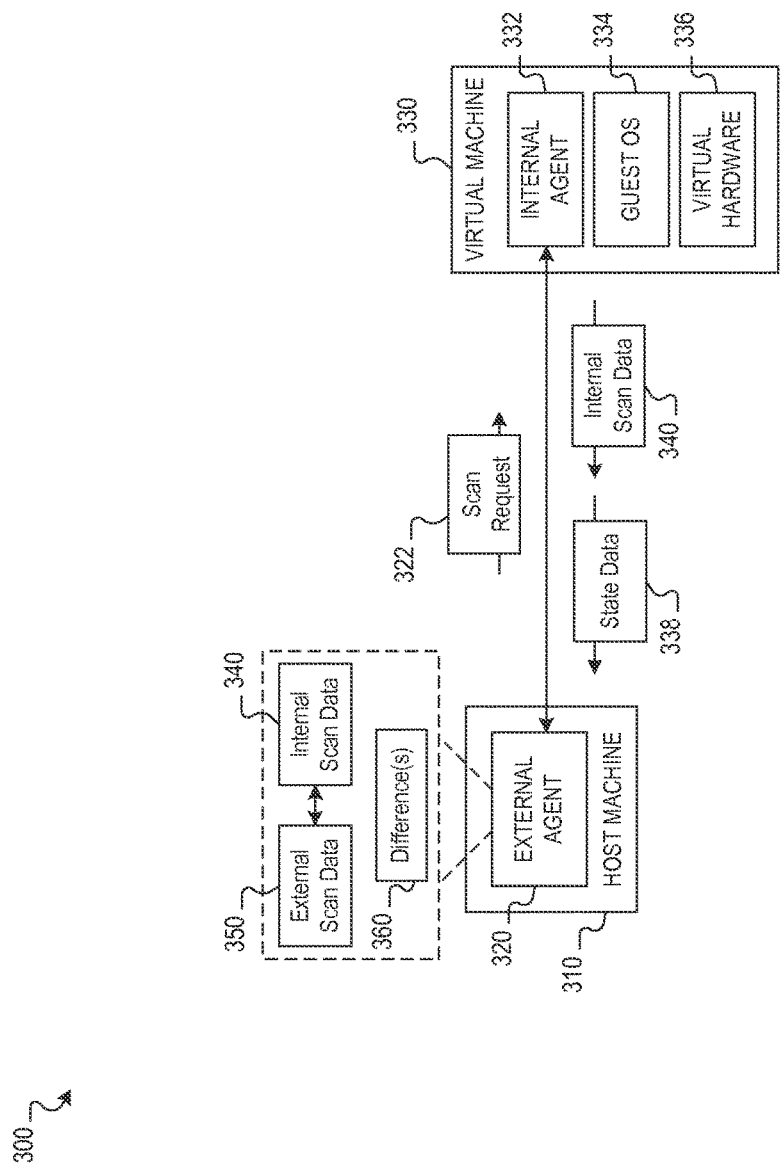
FIG. 3 is an example data flow for facilitating scanning of protected resources.

FIG. 3 is an example data flow 300 for facilitating scanning of protected resources. The example data flow 300 depicts an example process for facilitating scanning of protected resources in a virtual machine environment. A host machine 310, such as the host machine 210 discussed with reference to FIG. 2 above, includes an external agent 320 that sends a scan request 322 to an internal agent 332 running on a virtual machine 330, e.g., a virtual machine hosted by the host machine 310. As with the virtual machine discussed above, the virtual machine 330 includes a guest OS 334 and virtual hardware 336, each of which may include protected resources.

By way of example, the scan request 322 may include a request to scan network resources of the virtual machine 330; specifically, for example, the ARP and DNS cache. The scanning of other resources, protected or otherwise, may also be specified in the scan request 322. In some implementations, the scan request 322 is not an explicit request sent from the external agent 320 to the internal agent 332, but may be a triggered request, e.g., every 24 hours, the internal agent 332 may place the virtual machine in a particular state for the external agent 320 to scan.

After placing a protected resource in a particular state, the internal agent 332 may provide the external agent 320 with state data 338 that indicates that the protected resource is in a state ready to be scanned. For example, in response to receiving a request to scan network resources, the internal agent 332 may clear the ARP and DNS cache and repopulate the caches with updated data, e.g., by making lookup requests for each cleared cache entry. Data indicating that the ARP and DNS cache have been recently cleared and repopulated may then be provided to the external agent 320.

The external agent 320 may generate external scan data 350 by scanning the protected resource. The external scan data 350 specifies the state of the protected resource(s), e.g., as observed by the external agent 320. For example, in situations where network resources, e.g., the ARP and DNS cache, were cleared and repopulated with updated data, the external agent may scan the ARP and DNS cache and perform lookup requests, e.g., querying entities specified in entries of each cache to ensure the updated cache entries, when queried by the external agent 320, resolve as expected.

The internal agent 332 may, in some implementations, provide the external agent with internal scan data 340. The internal scan data 340 specifies the state of the protected resource(s), e.g., as observed by the internal agent 332. In the network resources example, the internal scan data 340 may include data that indicates the results of the internal agent's lookup requests performed using the updated ARP and DNS cache entries. While, in the above example, provision of the internal scan data 340 is described subsequent to generation of external scan data 350, that need not be the case. In some implementations, for example, the internal agent 332 may provide the internal scan data 340 with the state data 338.

In the example data flow 300, the external agent 320 compares the external scan data 350 with the internal scan data 340 to identify any differences. Comparison of the internal query results of the ARP and DNS cache entries, provided by the internal agent 332, with the external query results of the ARP and DNS cache entries will, in a non-compromised system, likely result in no differences. However, if the virtual machine 330 has been compromised, e.g., through faulty or malicious hardware and/or software, differences in the scan data may alert the external agent to a potential problem with the virtual machine 330. For example, if a DNS query performed by the internal agent 332 returns a different result than the same DNS query performed by the external agent 320, the virtual machine 330 may potentially be compromised.

Figure 4:
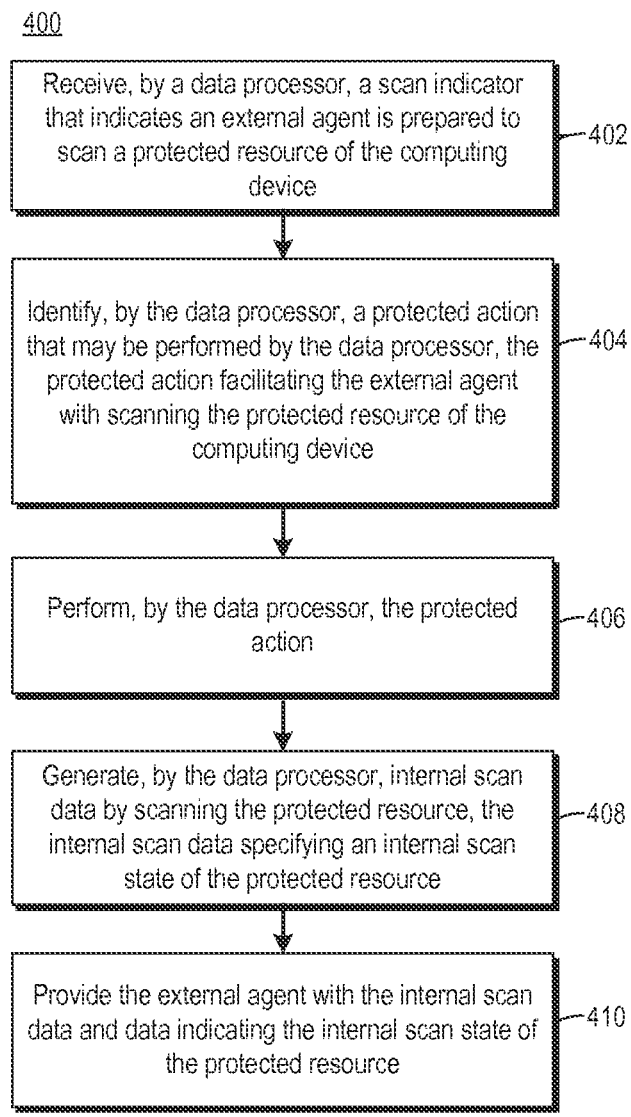
FIG. 4 is a flowchart of an example method for facilitating scanning of protected resources.

FIG. 4 is a flowchart of an example method 400 for facilitating scanning of protected resources. The method 400 may be performed by a computing device, such as a computing device described in FIG. 1. Other computing devices may also be used to execute method 400. Method 400 may be implemented in the form of executable instructions stored on a machine-readable storage medium, such as the storage medium 120, and/or in the form of electronic circuitry.

A data processor receives a scan indicator that indicates an external agent is prepared to scan a protected resource of the computing device (402). The scan indicator may be, for example, a dock signal, indicating a particular predetermined time at which an external agent is prepared to scan the protected resource.

The data processor identifies a protected action that may be performed by the data processor, the protected action facilitating the external agent with scanning the protected resource of the computing device (404). The protected action includes a change in the state of the protected resource. For example, to assist the external agent with scanning the processes performed or being performed by the computing device, the data processor may identify, as the protected action, the action of loading swapped out processes into RAM.

The data processor performs the protected action (406). For example, the data processor may cause any swapped out processes to be loaded into RAM. As noted above, other actions, protected and otherwise, may also be performed by the data processor to facilitate scanning resources, protected and otherwise, of the computing device.

The data processor generates internal scan data by scanning the protected resource, the internal scan data specifying an internal scan state of the protected resource (408). For example, in situations where the protected resource is process data, the data processor may scan the process data, including active and swapped out processes, to generate scan data that specifies the state of the processes of the computing device, as observed internally.

The data processor provides the external agent with the internal scan data and data indicating the internal scan state of the protected resource (410). For example, an internal agent of the computing device may provide the external agent with i) the scan data, which specifies the state of the computing system's processes as observed by the internal agent, and ii) data that indicates the computing system's swapped out processes have been loaded into RAM.

As discussed above, the information provided to the external agent may be used by the external agent to detect and diagnose potential problems, such as malware or faulty software, with a target system. The processes described above work in multiple environments, including environments with distinct computing devices, environments making use of virtual machines, or a combination thereof.

The foregoing disclosure describes a number of example implementations for facilitating scanning of protected resources. As detailed above, examples provide a mechanism for using an internal agent to perform actions that make protected resources available for scanning by an external agent.

We claim:

1. A computing device comprising:
a data processor; and
a data storage device storing instructions that, when executed by the data processor, cause the data processor to:
receive a scan indicator that indicates an external agent is prepared to scan a protected resource of the computing device;
identify a protected action to be performed by the data processor, the protected action facilitating scanning the protected resource of the computing device by the external agent, the protected resource comprising data stored in the computing device, and the protected action comprising clearing or flushing a cache in the computing device;
perform the protected action that comprises clearing or flushing the cache in the computing device; and
provide the external agent with data indicating a current state of the protected resource.

2. The computing device of claim 1, wherein the external agent is included in an external computing device that is separate from the computing device.

3. The computing device of claim 1, wherein the computing device comprises a virtual machine implemented by a host computing device, and wherein the external agent is implemented by the host computing device external to the virtual machine.

4. The computing device of claim 1, wherein providing the external agent with the data indicating the current state of the protected resource is performed after the clearing or flushing of the cache and is to cause the external agent to scan the protected resource.

5. The computing device of claim 1 wherein:
the protected action further comprises loading registry data into a random access memory (RAM) responsive to the protected resource comprising registry data;
the protected action further comprises loading swapped out memory pages into the RAM responsive to the protected resource comprising RAM data; and
the protected action further comprises loading one or more swapped out processes into the RAM responsive to the protected resource comprising process data.

6. The computing device of claim 1, wherein the protected resource comprises network data, and the protected action comprises clearing a network cache of the computing device, and wherein providing the external agent with the data indicating the current state of the protected resource is performed after the clearing of the network cache and is to cause the external agent to scan the protected resource.

7. The computing device of claim 1, wherein the protected resource comprises persistent storage data, and the protected action comprises flushing the cache for a persistent storage of the computing device, and wherein providing the external agent with the data indicating the current state of the protected resource is performed after the flushing of the cache and is to cause the external agent to scan the protected resource.

8. The computing device of claim 1, wherein providing the external agent with the data indicating the current state of the protected resource is performed after the clearing or flushing of the cache and is to cause the external agent to perform an external scan of the protected resource, the computing device further comprising:
an internal agent executable on the data processor to perform an internal scan of the protected resource, and provide a result of the internal scan to the external agent to cause the external agent to identify a difference based on comparing the result of the internal scan with a result of the external scan.

9. A method performed by a computing device, comprising:
receiving a scan indicator that indicates an external agent is prepared to scan a protected resource of the computing device;
identifying a protected action to be performed by a data processor of the computing device, the protected action facilitating the external agent with scanning the protected resource of the computing device and comprising a change in a state of the protected resource, the protected action comprising clearing or flushing a cache in the computing device;
performing the protected action;
generating internal scan data by scanning the protected resource by an internal agent of the computing device, the internal scan data specifying an internal scan state of the protected resource; and
providing the external agent with the internal scan data and data indicating the internal scan state of the protected resource to cause the external agent to identify a difference based on comparing the internal scan data with a result of an external scan of the protected resource performed by the external agent.

10. The method of claim 9, wherein the computing device comprises a virtual machine in which the internal agent is executable, and wherein the external agent is part of the computing device and is external of the virtual machine.

11. The method of claim 9, wherein the external agent is included in an external computing device that is separate from the computing device.

12. The method of claim 9, wherein:
the protected action further comprises loading registry data into a random access memory (RAM) responsive to the protected resource comprising registry data;
the protected action further comprises loading swapped out memory pages into the RAM responsive to the protected resource comprising RAM data;
the protected action further comprises loading one or more swapped out processes into the RAM responsive to the protected resource comprising process data.

13. A non-transitory machine-readable storage medium encoded with instructions executable by a hardware processor for facilitating scanning of protected resources, the instructions to cause the hardware processor to:
provide an internal agent with a request to place a protected resource of a target computing device in which the internal agent is implemented in a particular state for scanning;
receive, from the internal agent, data indicating that the protected resource is in the particular state for scanning;
generate external scan data by scanning the protected resource of the target computing device from outside an environment of the target computing device, the external scan data specifying an external scan state of the protected resource;
obtain internal scan data from the internal agent, the internal scan data produced by the internal agent running in the environment of the target computing device and scanning the protected resource, the internal scan data specifying an internal scan state of the protected resource of the target computing device; and compare the external scan data and the internal scan data to identify a difference.

14. The non-transitory machine-readable storage medium of claim 13, wherein the instructions further cause the hardware processor to:

determine, in response to identifying the difference in the external scan data and the internal scan data, that the target computing device is compromised.

15. The non-transitory machine-readable storage medium of claim 13, wherein the target computing device comprises a virtual machine implemented by the computing device.

16. The storage medium of claim 13, wherein:

the particular state for scanning comprises a state wherein registry data is loaded into a random access memory (RAM) of the target computing device responsive to the protected resource comprising registry data;

the particular state for scanning comprises a state wherein swapped out memory pages are loaded into the RAM of the target computing device responsive to the protected resource comprising RAM data;

the particular state for scanning comprises a state wherein one or more swapped out processes are loaded into the RAM of the target computing device responsive to the protected resource comprising process data;

the particular state for scanning comprises a state wherein a network cache of the target computing device is cleared responsive to the protected resource comprising network data; and the particular state for scanning comprises a state wherein a cache for the permanent storage of the target computing device is flushed responsive to the protected resource comprising permanent storage data.

17. The non-transitory machine-readable storage medium of claim 13, wherein the protected action comprising clearing or flushing a cache in the target computing device.

18. The non-transitory machine-readable storage medium of claim 13, wherein the protected resource comprises network data, and the protected action comprises clearing a network cache of the target computing device, and wherein the external scan is performed after clearing the network cache.

19. The non-transitory machine-readable storage medium of claim 13, wherein the protected resource comprises persistent storage data, and the protected action comprises flushing the cache for a persistent storage of the target computing device, and wherein the external scan is performed after flushing the cache.

* * * * *